March 5, 1963  G. E. COLBY  3,080,170
SEAL PROVIDING FOR SUBSTANTIAL AXIAL MOVEMENT
Filed Jan. 2, 1959
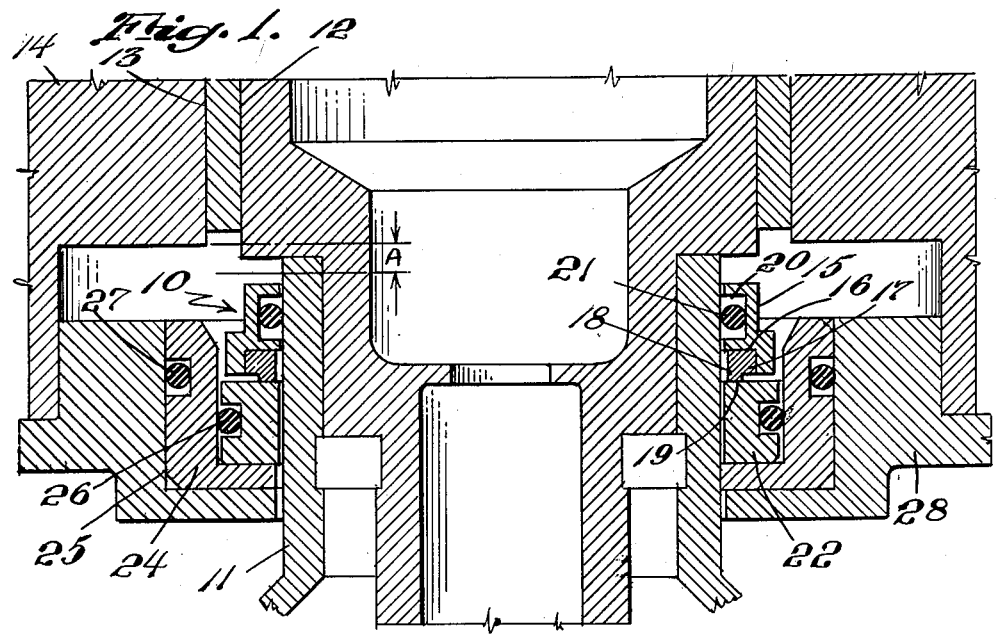
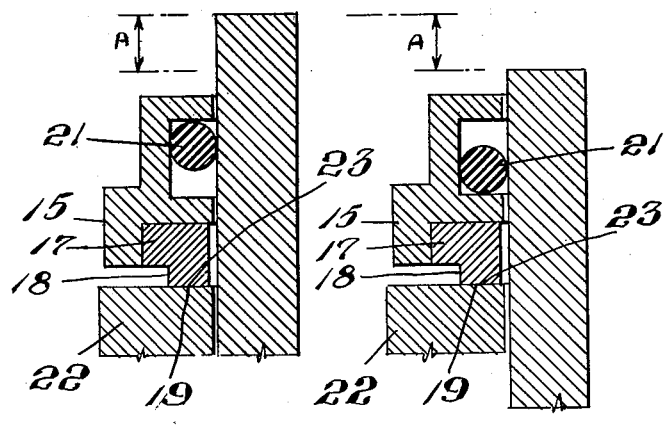
INVENTOR.
George E. Colby
BY
Barlow+Barlow
ATTORNEYS.

3,080,170
SEAL PROVIDING FOR SUBSTANTIAL
AXIAL MOVEMENT
George E. Colby, Barrington, R.I., assignor to Magnetic Seal Corp., a corporation of Rhode Island
Filed Jan. 2, 1959, Ser. No. 784,606
2 Claims. (Cl. 277—93)

This invention relates to a seal which will be used where there is a substantial axial movement of the shaft with reference to the housing through which it extends. O-rings will usually take care of a small amount of axial movement of one part relative to the other but usually the O-rings are so confined that relative movements of the parts which they seal of more than forty or fifty thousandths are not permitted.

One of the objects of this invention is to provide a seal which will permit of a movement many times greater than that which has heretofore been provided, such, for instance, as something in the range of a quarter of an inch or more.

With these and other objects in view, the invention consists of certain novel features of construction as will be more fully described and particularly pointed out in the appended claims.

In the accompanying drawings:

FIGURE 1 is a sectional view showing a shaft and housing with a seal in position between them.

FIGURES 2 and 3 are enlarged views showing the relative positions of an O-ring with reference to the recess in which it is located in one of the sealing parts.

Referring to the drawing in more detail, 10 designates a seal for a rotatable shaft 11 which is journalled in a bearing 12 suitably secured in a bore 13 of a housing or casing 14. The shaft has a maximum end play "A" of approximately 3/32 of an inch. The seal 10 comprises a member or sleeve 15 which encircles the shaft 11 and is provided with an annular recess 16 which extends inwardly at one end of the sleeve concentric with the axis of the shaft. An annular carbon graphite ring 17 is inserted in said recess and is suitably secured therein. The ring 17 is provided with a reduced annular portion 18 which extends a slight distance beyond the sleeve 15 and which is lapped or otherwise made flat within 2 helium light bands to form a sealing surface 19. The sleeve 15 is provided with a second annular recess 20 with fixed end walls which extends radially outwardly from the axis of the sleeve at a location between the ends thereof. An O-ring 21 is positioned in the recess 20 and encircles the shaft 11 in sealing engagement therewith, the outer periphery of the O-ring having sealing engagement with the outer wall of recess 20. The O-ring 21 has a body the cross-sectional diameter of which is greater than the space between the shaft 11 and the outer wall of the recess 20 providing a driving connection for rotating the sleeve with the shaft 11.

An Alnico magnetic ring 22 encircles the shaft 11 adjacent to the sealing surface or face 19. The face surface 23 of the magnetic ring 22 is also lapped or made flat within 2 helium light bands to form a sealing surface to engage the sealing face 19 of the carbon ring 17.

The ring 22 is carried in a non-magnetic cup-like member or adapter 24 which is secured in a counter bore 25 in the closing cap 28 against rotation relative thereto. An O-ring seal 26 is positioned between the outer periphery of ring 22 and the adjacent inner wall of adapter 24. An O-ring 27 is positioned between the outer periphery of adapter 24 and the adjacent wall portion of the counter bore 25. The ring 22 and adapter 24 are held against axial movement relative to the casing 14 by the cap 28 and a sufficient clearance exists between the seal and shaft to permit of the end play above mentioned.

It will be apparent that the sealing faces 19 and 23 may rock on their O-ring mountings to present their flat faces together and are magnetically held to each other in fluid tight sealing relation and that the O-rings above described will block the escape of fluid along the surfaces engaged.

O-ring seals are usually molded with a body which is circular in cross-section. In use the O-ring is usually confined within a recess provided in one of the parts to be sealed. The use of an O-ring for sealing between parts which have relative axial movement greater than forty or fifty thousandths of an inch, has not been satisfactory when one of the parts to be sealed is a shaft having greater end play than the above mentioned range of axial movement, and the other part is a sleeve of a seal structure axially movable relative to the shaft and having a sealing face held in sealing relation by magnetic force. The O-ring is usually confined in a recess only slightly greater in axial dimension than the diameter of the O-ring thus having an axial dimension such that, upon axial movement of the shaft a distance greater than the range above mentioned, the O-ring will be moved with the shaft against one end or the other of the recess to further compress the O-ring to an extent such that when moved in one direction, it will overcome the magnetic force and move the sleeve out of sealing relation. It has been found that if the axial dimension of the recess is made of a sufficient extent to allow the O-ring body to roll axially of the shaft along the surfaces engaged more than 180°, that a twist may be placed in the body of the ring, and the O-ring will not recover uniformally to normal but will make a so-called snake or zigzag line engagement with the surfaces engaged thereby destroying proper sealing at the O-ring. For example, if the body of an O-ring is rolled about its axis along the surfaces engaged thereby through an angular distance of 180°, the body would be in effect twisted about its axis. The portion of the O-ring normally (or when under no tension or stress) at the inner diameter of the O-ring would have been moved to the outer periphery of the O-ring and would be in tension. That portion of the O-ring normally at the outer periphery of the O-ring would have been moved to the inner diameter of the O-ring and would be under compression. O-rings are resilient and upon being free to relax have a tendency to recover to normal. However, as above mentioned, when rolled or twisted an angular distance of nearly 180°, the O-ring will not recover uniformally and will make a so-called snake line engagement with the surfaces engaged and destroy the sealing of the O-ring.

I have overcome the above problem as follows. I make the body of the O-ring 21 of a diameter in cross-section such that one half the circumference of the O-ring body is greater than the distance of movement of end play in the parts engaged thereby. The recess in which the O-ring is to be combined is made of an extent to allow rolling of the O-ring body through an angular distance substantially equal to the amount of axial movement in said parts or sufficient so that the recess end walls will not restrict the movement of the O-ring. Thus the O-ring body would be rolled through an angular distance always less than 180° and tend to uniformally recover to normal.

It will be understood that an O-ring is usually confined in a recess in one of the parts to be sealed. However, it is contemplated that in some situations a recess may be provided in each of the parts to be sealed.

I claim:
1. In a seal between a housing part and a shaft part extending through said housing part in which the shaft part has axial movement relative to the housing part of a predetermined distance, an annular sealing member in the housing part and surrounding the shaft part and having an annular recess extending radially from the shaft, an O-ring in said recess having a body circular in cross section engaging the shaft, one half the circumference of the cross section of said O-ring body being greater than the said predetermined distance of said axial movement of said parts whereby to prevent rolling of said O-ring greater than 180°, said recess having end walls fixed relative to each other between which said O-ring is located, said end walls being spaced in an axial dimension at least equal to one half of the said circumference of said O-ring body to prevent restriction of rolling of the O-ring.

2. A seal as set forth in claim 1 wherein said shaft part has a relative axial movement of at least 3/16 of an inch.

References Cited in the file of this patent
UNITED STATES PATENTS

| | | |
|---|---|---|
| 1,859,436 | Durdin | May 24, 1932 |
| 2,473,139 | Dickerman | June 14, 1949 |
| 2,561,132 | Payne | July 17, 1951 |
| 2,685,463 | Pollard | Aug. 3, 1954 |
| 2,843,403 | Stevenson | July 15, 1958 |
| 2,856,219 | Kosatka | Oct. 14, 1958 |